US012749420B2

(12) United States Patent
Le et al.

(10) Patent No.: US 12,749,420 B2
(45) Date of Patent: Sep. 29, 2026

(54) NEAR EYE DISPLAY

(71) Applicant: Tencent America LLC, Palo Alto, CA (US)

(72) Inventors: John D. Le, Palo Alto, CA (US); Kun Gao, Palo Alto, CA (US); Yi Zhang, Palo Alto, CA (US); Youngshik Yoon, Palo Alto, CA (US); Hao Zheng, Palo Alto, CA (US); Hongdong Li, Palo Alto, CA (US); Jianru Shi, Palo Alto, CA (US)

(73) Assignee: Tencent America LLC, Palo Alto, CA (US)

( * ) Notice: Subject to any disclaimer, the term of this patent is extended or adjusted under 35 U.S.C. 154(b) by 625 days.

(21) Appl. No.: 18/111,446

(22) Filed: Feb. 17, 2023

(65) Prior Publication Data

US 2024/0282228 A1 Aug. 22, 2024

(51) Int. Cl.

*G02F 1/31* (2006.01)
*G06F 1/16* (2006.01)
*G09G 3/00* (2006.01)

(52) U.S. Cl.

CPC ............... *G09G 3/007* (2013.01); *G02F 1/31* (2013.01); *G06F 1/163* (2013.01); *G09G 2340/0435* (2013.01); *G09G 2340/0464* (2013.01)

(58) Field of Classification Search

CPC ... G02F 1/31; G02F 1/13624; G02B 27/0176; G02B 27/0172; G02B 27/017;

(Continued)

(56) References Cited

U.S. PATENT DOCUMENTS

| | | | | |
|---|---|---|---|---|
| 6,297,852 | B1 | 10/2001 | Laksono et al. | |
| 2006/0221024 | A1* | 10/2006 | Hotta | G02F 1/13471 345/87 |

(Continued)

FOREIGN PATENT DOCUMENTS

| | | | | | |
|---|---|---|---|---|---|
| DE | 102017202213 | A1 * | 7/2018 | G06T 15/08 |
| JP | 2013195995 | A * | 9/2013 | |
| WO | WO-2006064751 | A1 * | 6/2006 | H04N 23/843 |

OTHER PUBLICATIONS

International Search Report with Written Opinion for PCT/US2023/074526, issued Jan. 24, 2024, 20 pages.

*Primary Examiner* — Sharrief I Broome
*Assistant Examiner* — Journey F Sumlar
(74) *Attorney, Agent, or Firm* — ArentFox Schiff LLP

(57) ABSTRACT

A near eye display system includes a display block, a shift block and a controller. The display block includes a display panel and one or more optical elements that direct light beams generated by the display panel to an image receiver to perceive an image displayed by the display panel as a virtual image. The shift block applies a spatial pixel shift adjustment to the virtual image. The controller provides a first image to the display block with a first spatial pixel shift adjustment, and provides a second image to the display block with a second spatial pixel shift adjustment. The first spatial pixel shift adjustment causes the first image being perceived as a first virtual image at first pixel locations, the second spatial pixel shift adjustment causes the second image being perceived as a second virtual image at second pixel locations that are shifted from the first pixel locations.

23 Claims, 9 Drawing Sheets

(58) Field of Classification Search
CPC .......... G02B 2027/0187; G02B 26/002; G02B 26/004; G02B 26/08; G02B 26/0841; G02B 26/0833; G02B 26/085; G02B 26/0858; G09G 3/007; G09G 2320/0214
See application file for complete search history.

(56) References Cited

U.S. PATENT DOCUMENTS

| | | | | |
|---|---|---|---|---|
| 2009/0244254 | A1* | 10/2009 | Mizuno | B41J 2/465 347/249 |
| 2010/0177025 | A1 | 7/2010 | Nagata et al. | |
| 2012/0188245 | A1* | 7/2012 | Hyatt | G09G 5/397 345/428 |
| 2014/0085553 | A1 | 3/2014 | Chen et al. | |
| 2016/0005344 | A1* | 1/2016 | Stine | G09G 3/2085 345/428 |
| 2017/0085799 | A1* | 3/2017 | Yoshida | H04N 23/60 |
| 2018/0213211 | A1* | 7/2018 | Tomizawa | G02B 30/30 |
| 2018/0295286 | A1* | 10/2018 | Maede | H04N 23/683 |
| 2019/0243134 | A1* | 8/2019 | Perreault | G02B 26/08 |
| 2019/0327419 | A1* | 10/2019 | Onomura | H04N 23/951 |
| 2020/0221072 | A1 | 7/2020 | Sariarslan | |
| 2020/0304763 | A1* | 9/2020 | Nakamura | H04N 9/3164 |
| 2021/0088793 | A1 | 3/2021 | Tominaga et al. | |

* cited by examiner

NEAR EYE DISPLAY

TECHNICAL FIELD

The present disclosure describes embodiments generally related to near eye display technology.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Near eye display (NED) devices are developed to provide improved user experience in the fields of augmented reality (AR) and virtual reality (VR). The NED devices can include various wearable devices, such as head mounted display (HMD) device, smart glasses, and the like. In an example, an HMD device includes a relatively small display panel and optics that can create a virtual image in the field of view of one or both eyes. To the eye, the virtual image appears at a distance and appears much larger than the relatively small display panel.

SUMMARY

Aspects of the disclosure provide methods and apparatuses for near eye display. In some examples, a system of near eye display includes a display block, a shift block and a controller. The display block includes a display panel and one or more optical elements. The display panel has a pixel array, and the one or more optical elements can direct light beams generated by the display panel to an image receiver (e.g., eye or detector) to perceive an image displayed by the display panel as a virtual image. The shift block is coupled to the display block, the shift block can apply a spatial pixel shift adjustment to the virtual image. The controller is coupled to the display block and the shift block, the controller can provide a first image to the display block with a first spatial pixel shift adjustment, and provide a second image to the display block with a second spatial pixel shift adjustment. The first spatial pixel shift adjustment causes the first image being perceived as a first virtual image at first pixel locations, the second spatial pixel shift adjustment causes the second image being perceived as a second virtual image at second pixel locations that are shifted from the first pixel locations.

According to an aspect of the disclosure, the shift block includes a mechanical shifter configured to apply the spatial pixel shift adjustment. In some examples, the mechanical shifter is configured to shift the display panel to apply the spatial pixel shift adjustment. In some examples, the mechanical shifter is configured to shift at least a first optical element in the one or more optical elements to apply the spatial pixel shift adjustment. The mechanical shifter includes at least one of a piezoelectric actuator, an electrostatic actuator, a magnetic actuator, a linear resonant actuator, and an eccentric rotating mass (ERM) vibration motor.

According to another aspect of the disclosure, the shift block includes an optical shifter coupled to at least a first optical element in the one or more optical elements to apply the spatial pixel shift adjustment. The optical shifter includes at least one of a liquid lens optical power modulator and/or a liquid crystal lens optical power modulator. In an example, the optical shifter includes a switchable liquid crystal coated over a surface of a prism film, the switchable liquid crystal is configured to have different refractive index values under different bias voltages.

In some examples, the controller is configured to provide a plurality of images to the display block with synchronized spatial pixel shift adjustments.

In some examples, the first pixel locations have a minimum pixel distance in a direction, the second pixel locations are shifted from the first pixel locations by a fraction of the minimum pixel distance in the direction.

In some examples, the pixel array has a first resolution, the first image is a first sampled image of a high resolution image, and the second image is a second sampled image of the high resolution image, the high resolution image has a higher resolution than the first resolution.

In some examples, the first sampled image is sampled at first positions on the high resolution image, the second sampled image is sampled at second positions that are shifted from the first positions on the high resolution image. A difference between the second spatial pixel shift adjustment and the first spatial pixel shift adjustment corresponds to a shift from the first positions to the second positions on the high resolution image.

In some examples, the controller provides sampled images that are sampled from a plurality of high resolution images to the display block with spatial pixel shift adjustments. Each of the plurality of high resolution images is down-sampled to generate K sampled images, K is a positive integer, the plurality of high resolution images has a first frame rate, the sampled images are provided to the display block with a second frame rate that is K times of the first frame rate.

In some examples, the second image is identical to the first image.

A method of image display in a near eye display system includes providing a first image to a display block. The display block includes a display panel and one or more optical elements to direct light beams generated by the display panel to be perceived as a virtual image. The display block displays the first image with a first spatial pixel shift adjustment that causes the first image to be perceived as a first virtual image having first pixel locations. The method further includes providing a second image to the display block. The display block displays the second image with a second spatial pixel shift adjustment that causes the second image to be perceived as a second virtual image having second pixel locations that are shifted from the first pixel locations.

According to an aspect of the disclosure, the method includes controlling a mechanical shifter to apply the first spatial pixel shift adjustment and the second spatial pixel shift adjustment. In some examples, the method includes controlling the mechanical shifter to shift the display panel to apply the first spatial pixel shift adjustment and the second spatial pixel shift adjustment. In some examples, the method includes controlling the mechanical shifter to shift at least a first optical element in the one or more optical elements to apply the first spatial pixel shift adjustment and the second spatial pixel shift adjustment. For example, the method can include controlling at least one of a piezoelectric actuator, an electrostatic actuator, a magnetic actuator, a linear resonant actuator, and an eccentric rotating mass (ERM) vibration motor.

According to another aspect of the disclosure, the method includes controlling an optical shifter coupled to at least a first optical element in the one or more optical elements to apply the first spatial pixel shift adjustment and the second spatial pixel shift adjustment. In some examples, the method includes controlling at least one of a liquid lens optical power modulator and/or a liquid crystal lens optical power modulator to apply the first spatial pixel shift adjustment and the second spatial pixel shift adjustment. In an example, the method includes controlling a bias voltage to a switchable liquid crystal coated over a surface of a prism film, the switchable liquid crystal is configured to have different refractive index values under different bias voltages.

In some examples, the method includes synchronizing a display of the first image and the second image with an application of the first spatial pixel shift adjustment and the second spatial pixel shift adjustment.

In some examples, the method includes determining that an image has a first resolution that is higher than a second resolution of the display panel, and down-sampling the image of the first resolution to partition the image into at least the first image and the second image of the second resolution.

In some examples, the method includes sampling the image of the first resolution at first positions to generate the first image of the second resolution, and sampling the image of the first resolution at second positions that are shifted from the first positions on the image to generate the second image of the second resolution, a difference between the second spatial pixel shift adjustment and the first spatial pixel shift adjustment corresponding to a shift from the first positions to the second positions.

In some examples, the method includes receiving a plurality of high resolution images of the first resolution, the plurality of high resolution images having a first frame rate. The method further includes sampling the plurality of high resolution images to generate sampled images of the second resolution, each of the plurality of high resolution images is down-sampled to generate K sampled images of the second resolution, K is a positive integer. The method includes providing the sampled images of the second resolution to the display block at a second frame rate that is K times of the first frame rate.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, these concepts may be practiced without these specific details.

Some aspects of the disclosure provide spatial pixel shift techniques for near eye display (NED) devices. In some examples, the spatial pixel shift techniques can be used to increase imaging resolutions for the NED devices. In some examples, the spatial pixel shift techniques can be used to reduce the screen door effect of the NED devices to improve user experience.

Figure 1:
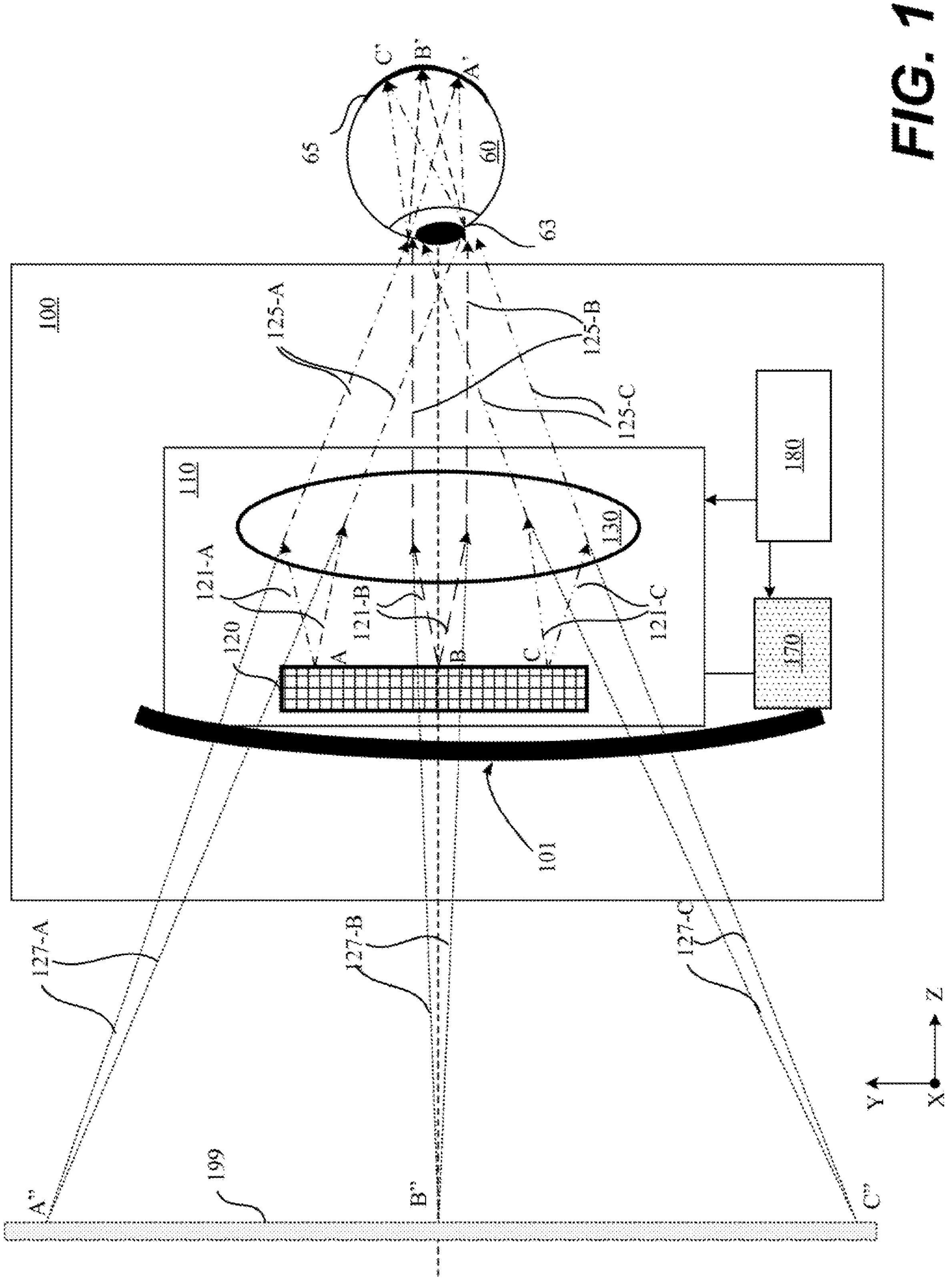
FIG. 1 shows a diagram illustrating a near eye display system in a side view according to some embodiments of the disclosure.

FIG. 1 shows a diagram illustrating a near eye display system (100) in a side view according to some embodiments of the disclosure. The display system (100) includes a display block (110), a shift block (170) and a controller (180). The display block (110) includes a display panel (120) and one or more optical elements (130). The display panel (120) includes a pixel array configured to emit lights and display images. The one or more optical elements (130) can direct the emitted lights to an image receiver, such as an eye (60), a detector (not shown), and the like to perceive the images displayed by the display panel (120) as virtual images, such as a virtual image (199) in FIG. 1. The virtual image (199) appears at a distance and appears much larger than the display panel (120).

Further, in FIG. 1, the shift block (170) is coupled to the display block (110) to apply suitable spatial pixel shift adjustments to the virtual images. The controller (180) is coupled to the display block (110) and the shift block (170) to control the operations of the display block (110) and the shift block (170). The operations of the controller (180), the display block (110) and the shift block (170) will be further descripted.

According to some aspects of the disclosure, the near eye display system (100) can be a component in an artificial reality system. The artificial reality system can adjust reality in some manner into artificial reality and then present the artificial reality to a user. The artificial reality can include, e.g., a virtual reality (VR), an augmented reality (AR), a mixed reality (MR), a hybrid reality, or some combination and/or derivatives thereof. Artificial reality content may include completely generated content or generated content combined with captured (e.g., real world) content. The artificial reality content may include video, audio, haptic feedback, or some combination thereof, and any of which can be presented in a single channel or in multiple channels (such as stereo video that produces a three-dimensional effect to the user).

The near eye display system (100) can be implemented in various form, such as a head mounted display (HMD), a smart glasses, a smart phone and the like. In some examples, the artificial reality system is implemented as a standalone near eye display system. In some examples, the artificial reality system is implemented as a near eye display system connected to a host computer system, such as a server device, a console device, and the like.

According to some aspects of the disclosure, "near eye" can be defined as including an optical element that is configured to be placed within, for example 35 mm, of an eye of a user while the near eye display system (100) (e.g., an HMD, a smart glasses) is being utilized.

It is noted that the near eye display system (100) can include other suitable mechanical, electrical and optical components. For example, the near eye display system (100) includes a frame (101) that can protect other components of the near eye display system (100). In another example, the near eye display system (100) can include a strap (not shown) to fit the near eye display system (100) on user's head. In another example, the near eye display system (100) can include communication components (not shown, e.g., communication software and hardware) to wirelessly communicate with a network, a host device, and/or other device. In some examples, the near eye display system (100) can include a light combiner that can combine the virtual content and see-through real environment.

The display panel (120) includes a pixel array. In some examples, the pixel array includes multiple pixels arranged in a two-dimensional surface. The resolution of the display panel (120) can be defined according to pixels in the two dimensions or one of the two dimensions of the two-dimensional surface. Each pixel in the pixel array can generate light beams. For example, a pixel A of the display panel (120) emits light beams (121-A), a pixel B of the display panel (120) emits light beams (121-B), and a pixel C of the display panel (120) emits light beams (121-C).

The one or more optical elements (130) are configured to modify the light beams, and direct the modified light beams to the eye (60). According to some aspects of the disclosure, the one or more optical elements (130) are configured to modify the light beams to be perceived as the virtual image (199). For example, the one or more optical elements (130) bend the light beams (121-A) to generate the modified light beams (125-A) that are diverging rays. The modified light beams (125-A) are traced backward to be perceived as from A" (e.g., the focus point of the virtual light beams (127-A) that are the backward traced rays of the modified light beams (125-A)). Similarly, the one or more optical elements (130) bend the light beams (121-B) to generate the modified light beams (125-B) that are diverging rays. The modified light beams (125-B) are traced backward to be perceived as from B" (e.g., the focus point of the virtual light beams (127-B) that are the backward traced rays of the modified light beams (125-B)). Similarly, the one or more optical elements (130) bend the light beams (121-C) to generate the modified light beams (125-C) that are diverging rays. The modified light beams (125-C) are traced backward to be perceived as from C" (e.g., the focus point of the virtual light beams (127-C) that are the backward traced rays of the modified light beams (125-C)).

According to some aspects of the disclosure, the eye (60) can reimage the virtual image onto the retina (65) of the eye (60) because cornea and lens (63) of the eye (60) can provide positive focusing power. The diverging rays appearing from the virtual image are refracted, i.e. bent so as to converge and project a real image on the retina (65), thus the virtual image is perceived. For example, the eye (60) can converge the modified light beams (125-A) to a focus point A' on the retina (65), the eye (60) can converge the modified light beams (125-B) to a focus point B' on the retina (65), the eye (60) can converge the modified light beams (125-C) to a focus point C' on the retina (65).

In some embodiments, the one or more optical elements (130) can include, for example, diffractive optical elements (gratings and prisms), refractive optical elements (lenses), reflective optical elements, guiding elements (e.g., planar waveguides and/or fibers), polarization optical elements (e.g., reflective polarizers, retarders, half-wave plates, quarter wave-plates, polarization rotators, Pancharatnam-Berry Phase lens—PBP-, and the like), beam splitter, waveguides or combination of those elements.

It is noted that the shift block (170) can apply the spatial pixel shift adjustment mechanically or optically. According to an aspect of the disclosure, the shift block (170) includes a mechanical shifter to apply the spatial pixel shift adjustment. In some examples, the mechanical shifter can shift the display panel (120) to apply the spatial pixel shift adjustment. In some examples, the mechanical shifter can shift at least one (referred to a first optical element) in the one or more optical elements (130) to apply the spatial pixel shift adjustment.

Figure 2:
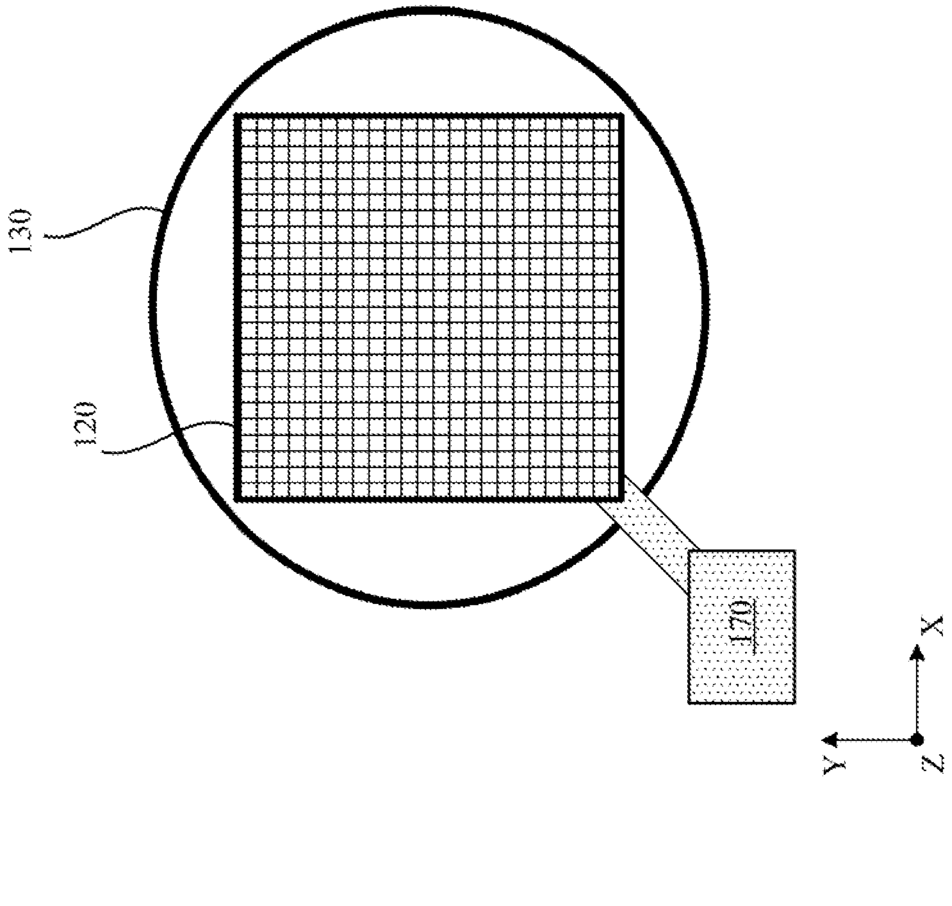
FIG. 2 shows a diagram illustrating an example of applying a spatial pixel shift adjustment in some embodiments.

FIG. 2 shows a diagram illustrating an example of applying the spatial pixel shift adjustment in some embodiments. In the FIG. 2 example, a front view of the display panel (120) and the one or more optical elements (130) is shown. The shift block (170) is coupled to the display panel (120). The shift block (170) can cause the display panel (120) to move in order to apply the spatial pixel shift adjustment to pixels of the virtual image.

Figure 3:
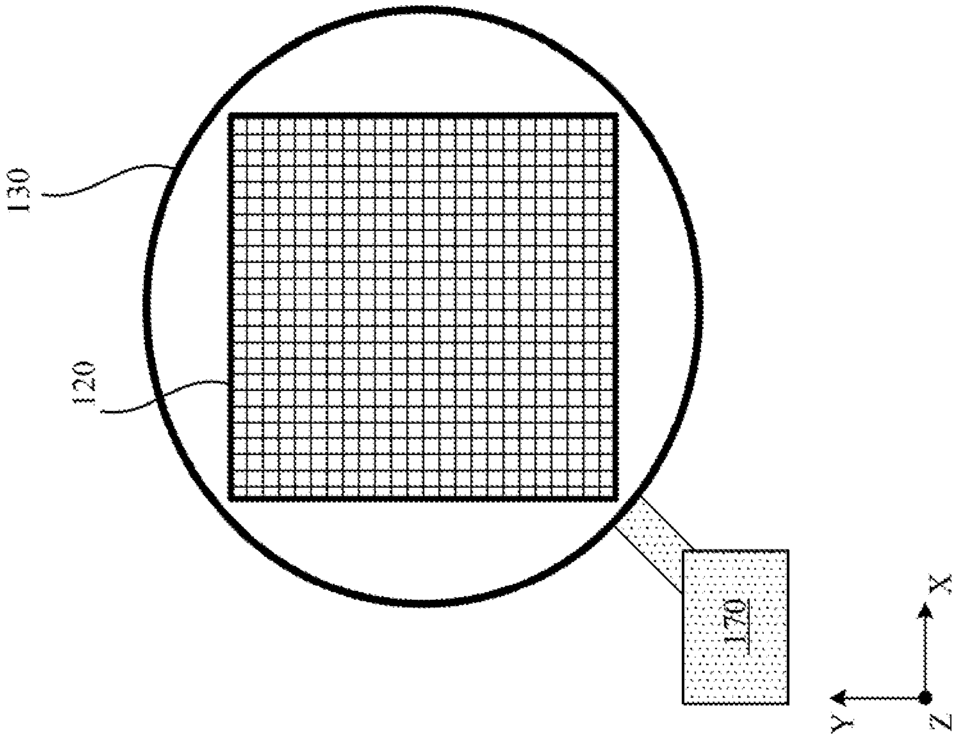
FIG. 3 shows a diagram illustrating an example of applying a spatial pixel shift adjustment in some embodiments.

FIG. 3 shows a diagram illustrating an example of applying the spatial pixel shift adjustment in some examples. In the FIG. 3 example, a front view of the display panel (120) and the one or more optical elements (130) is shown. The shift block (170) is coupled to at least one (e.g., the first optical element) of the one or more optical elements (130). The shift block (170) can cause at least the first optical element to move in order to apply the spatial pixel shift adjustment to pixels of the virtual image.

The mechanical shifter can include any suitable mechanical actuator, such as a piezoelectric actuator, an electrostatic actuator, a magnetic actuator, a linear resonant actuator, an eccentric rotating mass (ERM) vibration motor and the like.

According to another aspect of the disclosure, the shift block (170) includes an optical shifter coupled to at least a first optical element in the one or more optical elements (130) to apply the spatial pixel shift adjustment. The optical shifter can include at least one of a liquid lens optical power modulator and/or a liquid crystal lens optical power modulator. In some examples, the optical shifter can shift the display panel (120) to apply the spatial pixel shift adjustment. In some examples, the optical shifter can shift at least one (referred to a first optical element) in the one or more optical elements (130) to apply the spatial pixel shift adjustment. In an example, the optical shifter includes a switchable liquid crystal coated over a surface of a prism film. The switchable liquid crystal can be controlled (e.g., by applying a bias voltage) to switch between an OFF state and an ON state. In the OFF state, the refractive index of the switchable liquid crystal is a first value (e.g., 1.55 in an example) and the reflective index of the prism film is a second value (e.g., 1.49 in an example). The light through the optical shifter can have a baseline shift due to prism mismatch. In the ON state, the refractive index of the switchable liquid crystal is a third value that is larger than the first value (e.g., 1.65 in an example), and the reflective index of the prism film is the second value (e.g., 1.49 in an example). The light through the optical shifter can have an additional shift relative to baseline shift. According to an aspect of the disclosure, the refractive index of the liquid crystal, and the geometry shape of prism film can be suitably configured such that the additional shift can be tuned to about ½ pixel spacing, such as 1-10 um in some examples.

According to some aspects of the disclosure, the controller (180) is configured to control the shift block (170) to apply the spatial pixel shift adjustment to cause pixel position changes in the perceived virtual image. In some examples, the controller (180) can control the shift block (170) to apply the spatial pixel shift adjustment that is synchronized (also referred to as in sync) with an image display rate of the display panel (120). In an example, the display panel (120) is configured to have a frame rate of 30 frames per second (fps), the controller (180) can control the shift block (170) to apply the spatial pixel shift adjustment at 120 Hz, thus the controller (180) can provide 4 spatial pixel shift adjustments to one frame. For example, the display panel (120) displays at a frame rate of 30 fps, and the shift block (170) shifts at 120 Hz, then a viewer can perceive composite images at 30 fps. Then the spatial pixel shift adjustment can be suitably configured to reduce screen door effect. In some examples, the spatial pixel shift adjustment does not need to be synchronized with the frame rate. In an example, the display panel (120) is configured to have a frame rate of 30 frames per second (fps), the controller (180) can control the shift block (170) to apply the spatial pixel shift adjustment with a frequency in a range of 50 Hz to 1.5 MHz.

The controller (180) can be implemented as processing circuitry or can be implemented as software instructions executed by processing circuitry.

Figure 4:
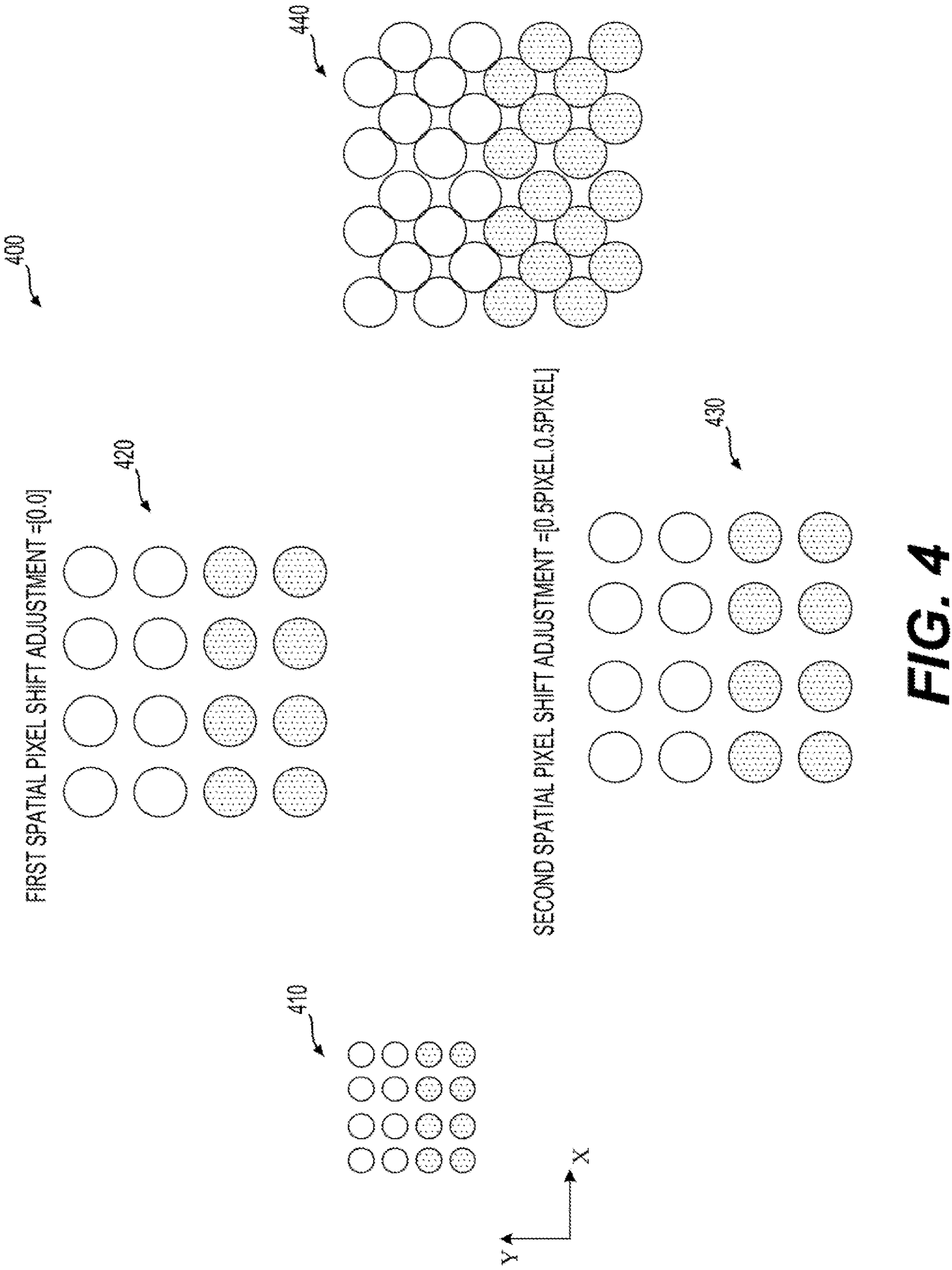
FIG. 4 shows a diagram illustrating an application of spatial pixel shift adjustment in some examples.

FIG. 4 shows a diagram illustrating an application of spatial pixel shift adjustment in some examples. In the FIG. 4 example, an image (410) is displayed in a display panel of a near eye display system, such as the display panel (120) of the near eye display system (100), during a time duration, such as from t to t+0.04 seconds for the frame rate of 25 frames per second.

It is noted that the image (410) is shown as 4×4 pixels (shown by 4×4 circles) for ease of illustration. The display panel (120) can include any suitable number of pixels in 2 dimensions, such as 2448×2448 pixels in an example, 1920×1800 in another example.

At time t, the controller (180) controls the shift block (170) to apply a first spatial pixel shift adjustment, and at time t+0.02, the controller (180) controls the shift block (170) to apply a second spatial pixel shift adjustment. In the FIG. 4 example, the first spatial pixel shift adjustment is [0,0], no spatial pixel shift is applied in both X direction and Y direction. The second spatial pixel shift adjustment is [0.5 pixel, 0.5 pixel], 0.5 pixel shift is applied to both X direction and the Y direction. In the FIG. 4 example, the first spatial pixel shift adjustment can cause the display block (110) to generate a first virtual image (420), for example during a first half of the time duration [t, t+0.04], and the second spatial pixel shift adjustment can cause the display block (110) to generate a second virtual image (430) during a second half of the time duration [t, t+0.04]. In some examples, due to persistence of vision, to an eye of a person, a perceived image can be an overlay of the first virtual image (420) and the second virtual image (430), such as shown by a perceived image (440) in FIG. 4.

According to an aspect of the disclosure, the pixel array in the display panel (120) can have unlit spaces between adjacent pixels, the unlit spaces can cause the eye to see a black visual grid, the black visual grid is referred to as a screen door effect. Using the spatial pixel shift can reduce the screen door effect. In the FIG. 4 example, the perceived image (440) has reduced screen door effect comparing to the first virtual image (420) or the second virtual image (430).

It is noted that while in the FIG. 4 example, the application of the spatial pixel shift adjustment is synchronized with the display of frame, in some other examples, the application of the spatial pixel shift adjustment does not need to be synchronized with the display of frames in order to reduce the screen door effect. In other words, the frequency of the spatial pixel shift adjustment does not need to be an integer number of times of the frame rate. In some examples, the controller (180) provides frames to the display panel (120) at a frame rate, and controls the shifter block (170) to apply the spatial pixel shift adjustment at a spatial pixel shift frequency. In an example, the spatial pixel shift frequency is an integer number of times of the frame rate (the integer is equal to or greater than 2), such as 2 time of the frame rate, 3 times of the frame rate, four times of the frame rate, and the like. In another example, the spatial pixel shift frequency is greater than the frame rate, but not an integer number of times of the frame rate.

According to some aspects of the disclosure, the spatial pixel shift techniques can allow a low resolution display to provide high resolution imaging to the eye. In some examples, a high resolution image is divided into multiple low resolution images using down sampling. For example, a high resolution image of 2M×2N pixels can be divided into 4 low resolution images of M×N pixels using down sampling, M and N are positive integers. The low resolution images can be displayed at a high frame rate by the low resolution display with different spatial pixel shift adjustments. For example, the frame rate for the high resolution image is 30 frames per second, and the frame rate to display the 4 low resolution images can be 120 frames per second. In some examples, due to persistence of vision, to an eye of a person, a perceived image can be an overlay of multiple virtual images with the different spatial pixel shift adjustments. The perceived image can correspond to the high resolution image. For example, the display panel (120) is configured to display the low resolution images at 120 fps, and the shift block can apply suitable spatial pixel shift adjustment at 120 fps. Then, the spatial pixel shift adjustment can be suitable configured, thus a viewer can perceive a high resolution image of effective 30 fps.

Figure 5:
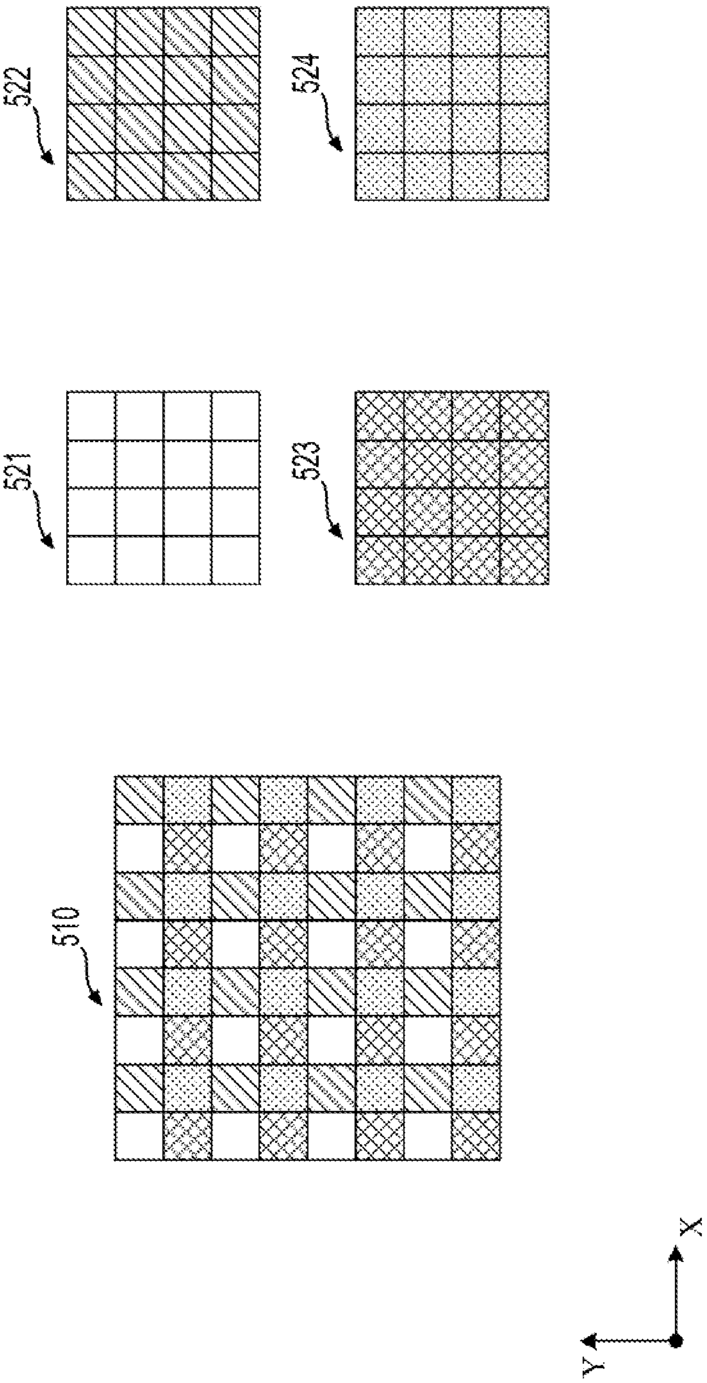
FIG. 5 shows an example of a partition of a high resolution image into low resolution images in some examples.

FIG. 5 shows an example of a partition of a high resolution image into low resolution images in some examples. In FIG. 5, a high resolution image is shown as an 8×8 image (510). The 8×8 image (510) can be partitioned into four 4×4 images (521)-(524) using down sampling.

In some examples, the partition is performed by the controller (180) in the near eye display system (100). For example, the controller (180) receives the high resolution image (510) from a communication component in the near eye display system (100). The controller (180) determines that the resolution of the high resolution image (510) is larger than the display panel (120), and then partitions the high resolution image (510) into four 4×4 images (521)-(524) that can be displayed by the display panel (120). For example, the controller (180) can sample the high resolution image (510), for example keep every other sample in both X direction and Y direction to generate the 4×4 image (521). Further, the controller (180) can sample the high resolution image (510) with a phase shift in the X direction to generate the 4×4 image (522); the controller (180) can sample the high resolution image (510) with a phase shift in the Y direction to generate the 4×4 image (523); the controller (180) can sample the high resolution image (510) with phase shifts in both the X direction and the Y direction to generate the 4×4 image (524).

In some examples, the partition is performed external of the near eye display system (100), such as a server device or a console device for the near eye display system (100). In an example, a game server can perform the partition (e.g., based on received information of the near eye display system (100)) to convert a high resolution image (e.g., 8×8 image (510)) into a display packet of low resolution images (e.g., 4×4 images (521)-(524)). The game server can provide the display packet of the low resolution images to, for example, a game console. The game console can transmit the display packet to the near eye display system (100) for display. The display packet can include a frame rate parameter indicative of a higher frame rate for displaying the display packet. For example, when the frame rate for high resolution images is 30 frames per second, the frame rate for the low resolution images is 120 frames per second.

In another example, the game control can perform the partition (e.g., based on information of the near eye display system (100)) to convert a high resolution image (e.g., 8×8 image (510)) into a display packet of low resolution images (e.g., 4×4 images (521)-(524)). The game console can transmit the display packet to the near eye display system (100) for display. The display packet can include a frame rate parameter indicative of a higher frame rate for displaying the display packet. For example, when the frame rate for high resolution images is 30 frames per second, the frame rate for the low resolution images is 120 frames per second.

In some embodiments, the controller (180) can provide the low resolution images to the display panel (120) for display and controls the shift block (170) to apply the spatial pixel shift adjustments in synchronization with the display of the low resolution images. For example, at time t, the controller (180) provides the 4×4 image (521) to the display panel (120), and controls the shift block (170) to apply a first spatial pixel shift adjustment; at time t+0.01 seconds, the controller (180) provides the 4×4 image (522) to the display panel (120), and controls the shift block (170) to apply a second spatial pixel shift adjustment; at time t+0.02 seconds, the controller (180) provides the 4×4 image (523) to the display panel (120), and controls the shift block (170) to apply a third spatial pixel shift adjustment; at time t+0.03 seconds, the controller (180) provides the 4×4 image (524) to the display panel (120), and controls the shift block (170) to apply a fourth spatial pixel shift adjustment. The spatial pixel shift adjustments are synchronized with the displays of the 4×4 images (521)-(524).

Accordingly, the display block (110) can generate four virtual images with different spatial pixel shift adjustments. Due to persistence of vision to the eye of a person, a perceived image can be an overlay of the four virtual images.

Figures 6A, 6B, 6C, 6D:
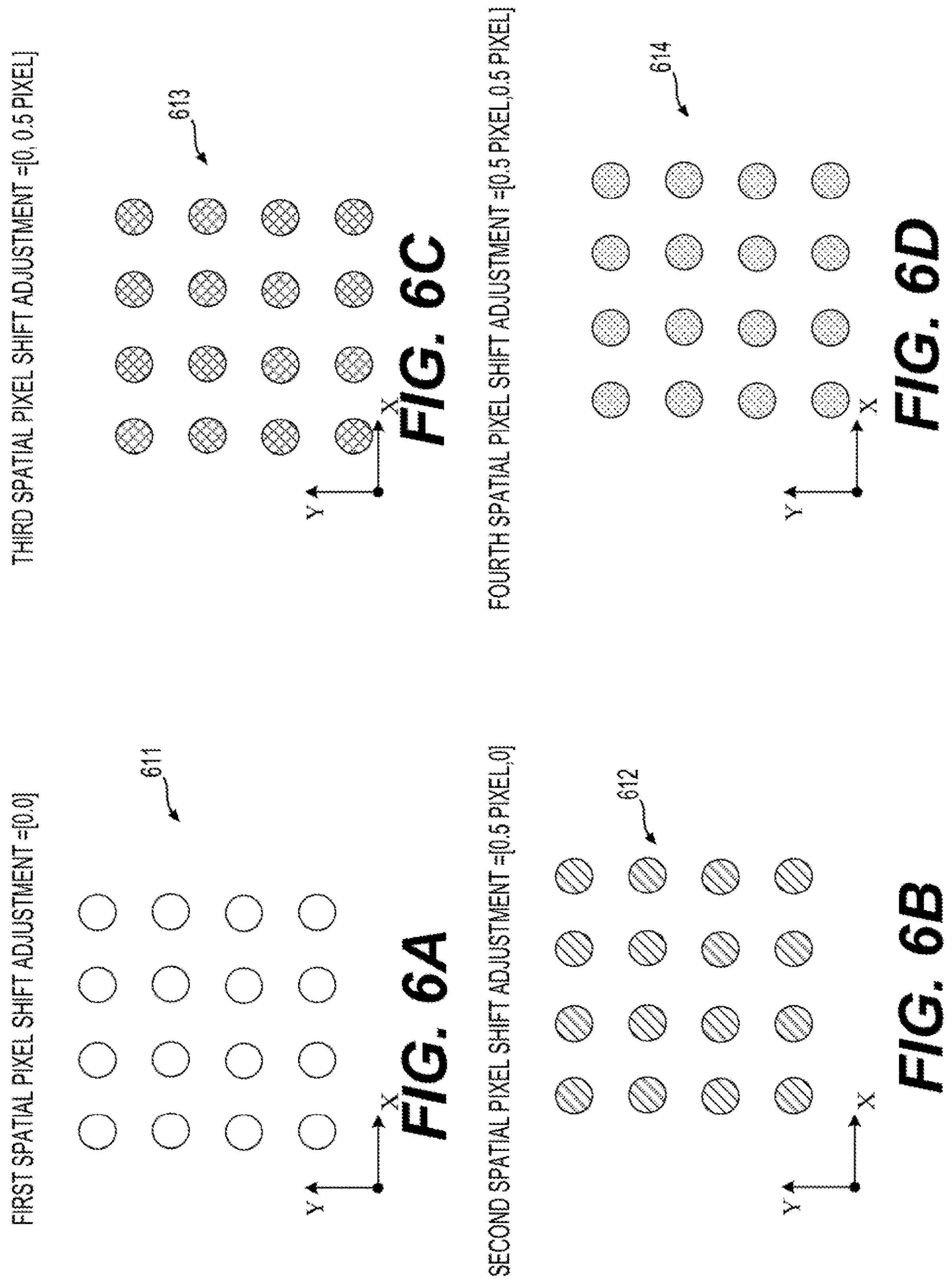
FIGS. 6A-6E show diagrams illustrating perceived images in some examples.

FIGS. 6A-6D show diagrams illustrating virtual images (611)-(614) generated by the display block (110) corresponding to the low resolution images, such as the 4×4 images (521)-(524) in some examples. Specifically, the display block (110) can generate the virtual image (611) corresponding to the 4×4 image (521) with the first spatial pixel shift adjustment as shown by FIG. 6A; the display block (110) can generate the virtual image (612) corresponding to the 4×4 image (522) with the second spatial pixel shift adjustment, as shown by FIG. 6B; the display block (110) can generate the virtual image (613) corresponding to the 4×4 image (523) with the third spatial pixel shift adjustment, as shown by FIG. 6C; the display block (110) can generate the virtual image (614) corresponding to the 4×4 image (524) with the fourth spatial pixel shift adjustment, as shown by FIG. 6D. In an example, the first spatial pixel shift adjustment is [0, 0], no spatial pixel shift is applied in X direction and the Y direction; the second spatial pixel shift adjustment is [0.5 pixel, 0], 0.5 pixel shift is applied in X direction and no pixel shift is applied in Y direction; the third spatial pixel shift adjustment is [0, 0.5 pixel], 0.5 pixel shift is applied to Y direction and no pixel shift is applied in the X direction; the fourth spatial pixel shift adjustment is [0.5 pixel, 0.5 pixel], 0.5 pixel shift is applied to both X direction and the Y direction.

Due to persistence of vision to the eye of a person, a perceived image can be an overlay of the four virtual images.

Figure 6E:
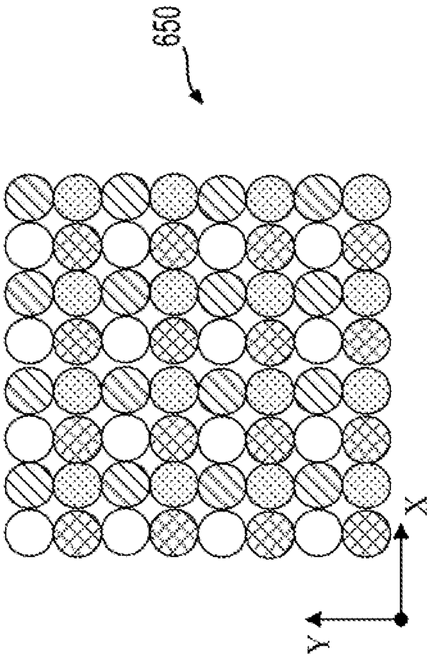

FIG. 6E shows a perceived image (650) by an eye in some examples. The perceived image (650) is an overlay of the virtual images (611)-(614). The perceived image (650) corresponds to the 8×8 image (510).

Figure 7:
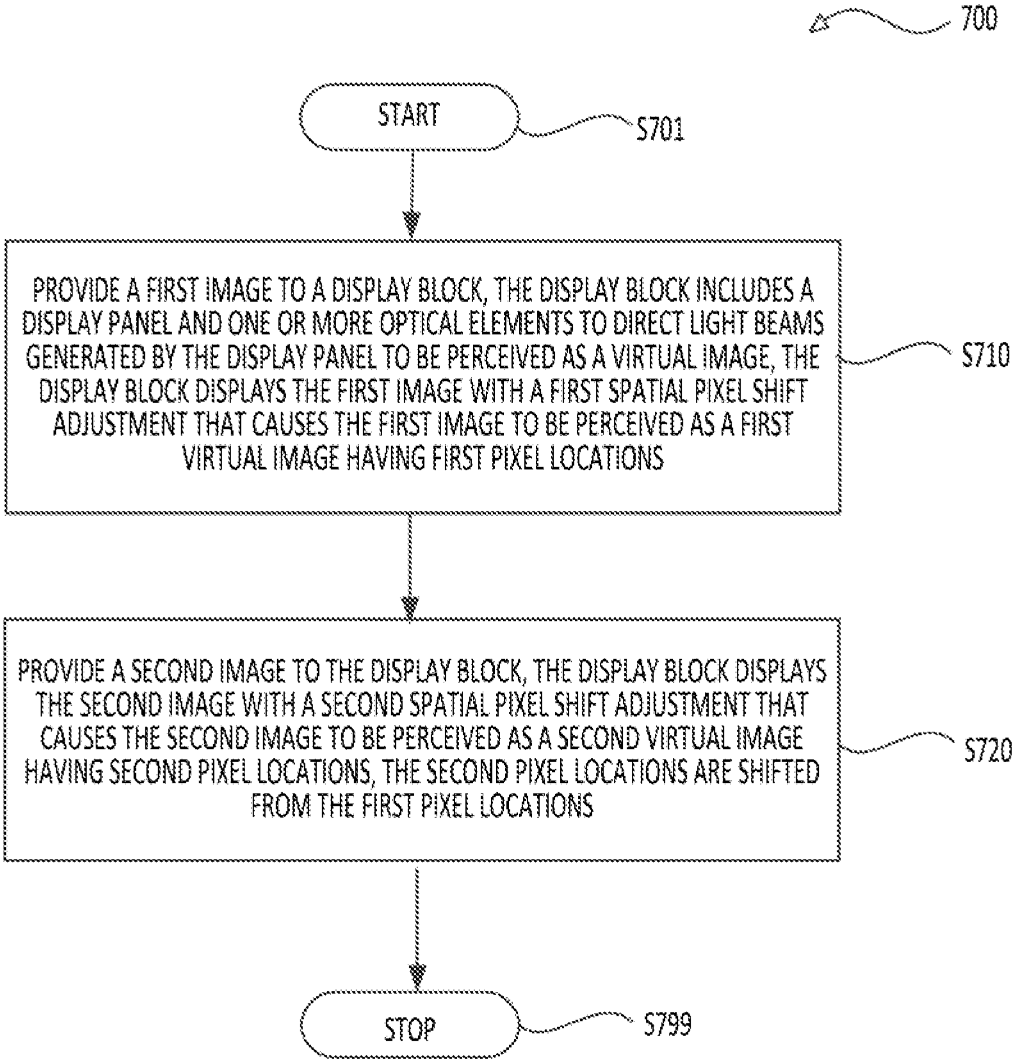
FIG. 7 shows a flow chart outlining a process according to some aspects of the disclosure.

FIG. 7 shows a flow chart outlining a process (700) according to an embodiment of the disclosure. In some embodiments, the process (700) is executed by the controller (180). The process starts at (S701) and proceeds to (S710).

At (S710), a first image is provided to a display block. The display block includes a display panel and one or more optical elements to direct light beams generated by the display panel to be perceived as a virtual image. The display block displays the first image with a first spatial pixel shift adjustment that causes the first image to be perceived as a first virtual image having first pixel locations.

At (S720), a second image is provided to the display block. The display block displays the second image with a second spatial pixel shift adjustment that causes the second image to be perceived as a second virtual image having second pixel locations that are shifted from the first pixel locations.

In some examples, the controller (180) controls a mechanical shifter to apply the first spatial pixel shift adjustment and the second spatial pixel shift adjustment. In an example, the controller (180) controls the mechanical shifter to shift the display panel to apply the first spatial pixel shift adjustment and the second spatial pixel shift adjustment. In another example, the controller (180) controls the mechanical shifter to shift at least a first optical element in the one or more optical elements to apply the first spatial pixel shift adjustment and the second spatial pixel shift adjustment. The mechanical shifter includes at least one of a piezoelectric actuator, an electrostatic actuator, a magnetic actuator, a linear resonant actuator, and an eccentric rotating mass (ERM) vibration motor.

In some examples, the controller (180) controls an optical shifter coupled to at least a first optical element in the one or more optical elements to apply the first spatial pixel shift adjustment and the second spatial pixel shift adjustment. The optical shifter includes at least one of a liquid lens optical power modulator and/or a liquid crystal lens optical power modulator to apply the first spatial pixel shift adjustment and the second spatial pixel shift adjustment. In an example, the optical shifter includes a switchable liquid crystal coated over a surface of a prism film. The switchable liquid crystal is configured to have different refractive index values under different bias voltages. The controller (180) can control a bias voltage to the switchable liquid crystal to apply the spatial pixel shift adjustment.

In some examples, the controller (180) can synchronize a display of the first image and the second image with an application of the first spatial pixel shift adjustment and the second spatial pixel shift adjustment.

In some examples, the controller (180) can determine that an image has a first resolution that is higher than a second resolution of the display panel, and then can down-sample the image of the first resolution to partition the image into at least the first image and the second image of the second resolution. In an example, the controller (180) can sample the image of the first resolution at first positions to generate the first image of the second resolution, and sample the image of the first resolution at second positions that are shifted from the first positions on the image to generate the second image of the second resolution, a difference between the second spatial pixel shift adjustment and the first spatial pixel shift adjustment corresponding to a shift from the first positions to the second positions.

In some examples, the controller (180) receives a plurality of high resolution images of the first resolution, the plurality of high resolution images has a first frame rate, for example corresponding to persistence of vision. The controller (180) samples the plurality of high resolution images to generate sampled images of the second resolution, each of the plurality of high resolution images is down-sampled to generate K sampled images of the second resolution, K is a positive integer. The controller (180) provides the sampled images of the second resolution to the display block at a second frame rate that is K times of the first frame rate.

In some examples, the first image is the same as the second image.

Then, the process proceeds to (S799) and terminates.

The process (700) can be suitably adapted. Step(s) in the process (700) can be modified and/or omitted. Additional step(s) can be added. Any suitable order of implementation can be used.

Figure 8:
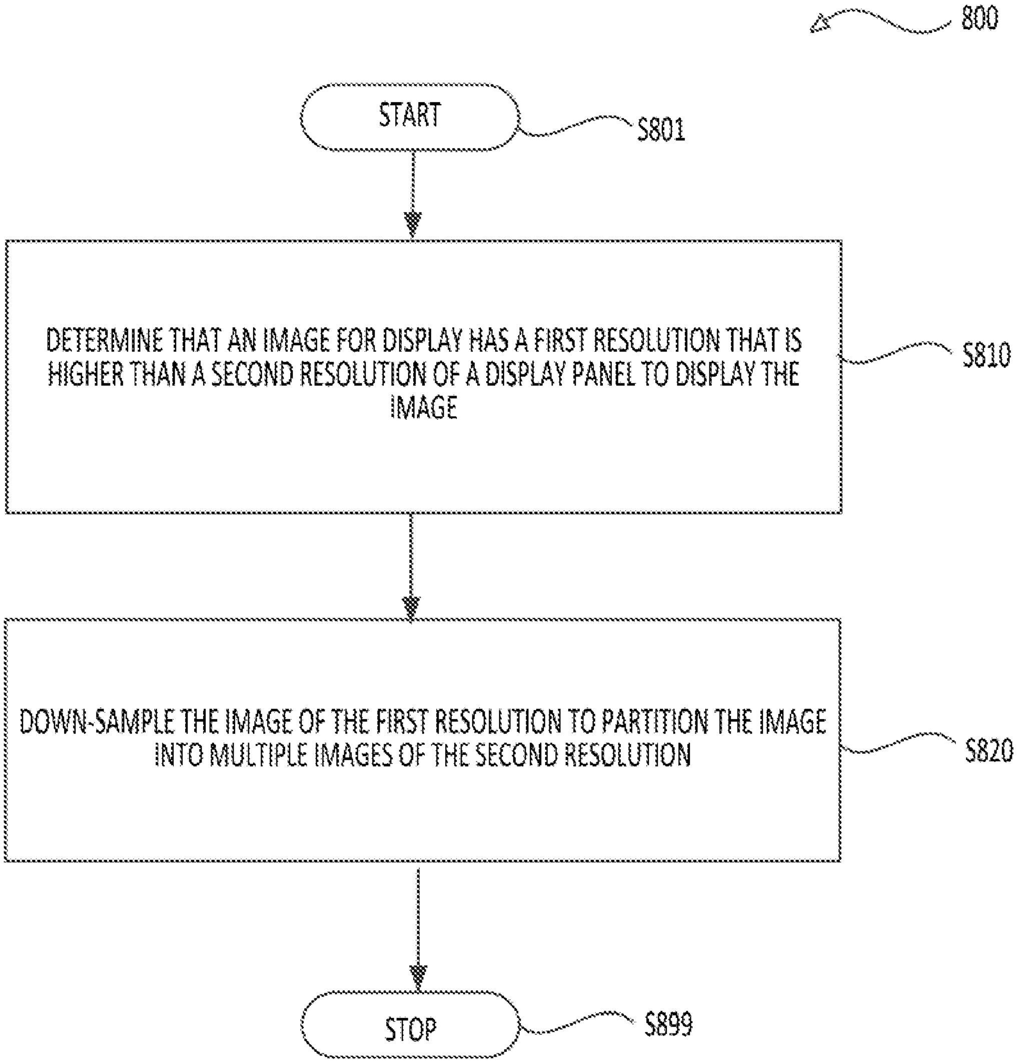
FIG. 8 shows a flow chart outlining a process according to some aspects of the disclosure.

FIG. 8 shows a flow chart outlining a process (800) according to an embodiment of the disclosure. In some examples, the process (800) is executed by a processing circuit, such as the controller (180), a server device, a console device and the like. The server device and the console device can be implemented as computer system in some examples. The process starts at (S801) and proceeds to (S810).

At (S810), the processing circuit determines that an image for display has a first resolution that is higher than a second resolution of a display panel to display the image.

At (S820), the processing circuit down-samples the image of the first resolution to partition the image into multiple images of the second resolution. In some examples, the processing circuit can form a display packet that includes the multiple images. In some examples, the display packet can include a parameter indicative of a frame rate for displaying the multiple images.

The techniques described above, can be implemented as computer software using computer-readable instructions and physically stored in one or more computer-readable media. For example, FIG. 9 shows a computer system (900) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 9:
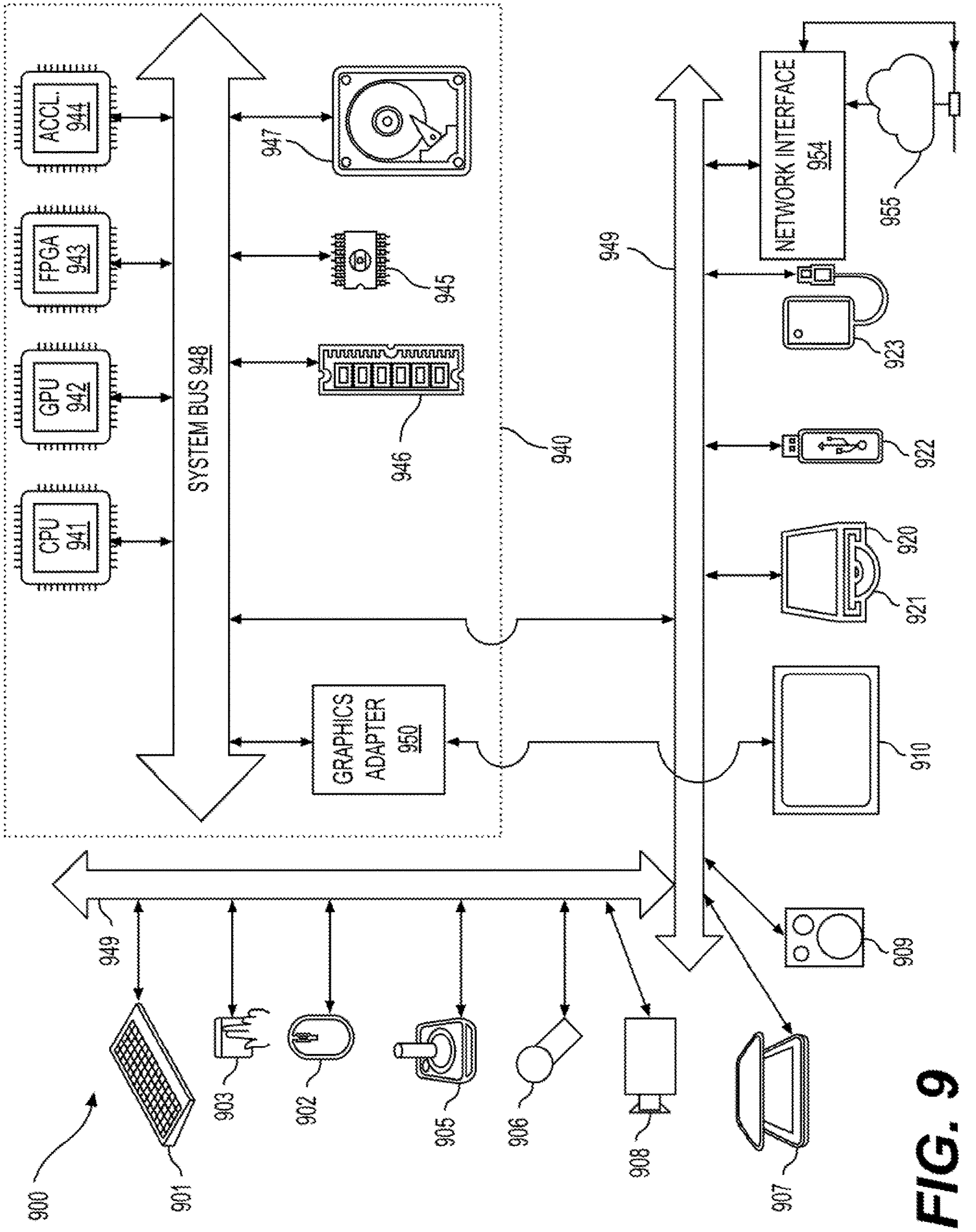
FIG. 9 is a schematic illustration of a computer system in accordance with an embodiment.

The components shown in FIG. 9 for computer system (900) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (900).

Computer system (900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (901), mouse (902), trackpad (903), touch screen (910), data-glove (not shown), joystick (905), microphone (906), scanner (907), camera (908).

Computer system (900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (910), data-glove (not shown), or joystick (905), but there can also be tactile feedback devices that do not serve as input devices), audio output devices (such as: speakers (909), headphones (not depicted)), visual output devices (such as screens (910) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (900) can also include human accessible storage devices and their associated media such as optical media including CD/DVD ROM/RW (920) with CD/DVD or the like media (921), thumb-drive (922), removable hard drive or solid state drive (923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (900) can also include an interface (954) to one or more communication networks (955). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (949) (such as, for example USB ports of the computer system (900)); others are commonly integrated into the core of the computer system (900) by attachment to a system bus as described below (for example Ethernet interface into a PC computer system or cellular network interface into a smartphone computer system). Using any of these networks, computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (940) of the computer system (900).

The core (940) can include one or more Central Processing Units (CPU) (941), Graphics Processing Units (GPU) (942), specialized programmable processing units in the form of Field Programmable Gate Areas (FPGA) (943), hardware accelerators for certain tasks (944), graphics adapters (950), and so forth. These devices, along with Read-only memory (ROM) (945), Random-access memory (946), internal mass storage such as internal non-user accessible hard drives, SSDs, and the like (947), may be connected through a system bus (948). In some computer systems, the system bus (948) can be accessible in the form of one or more physical plugs to enable extensions by additional CPUs, GPU, and the like. The peripheral devices can be attached either directly to the core's system bus (948), or through a peripheral bus (949). In an example, the screen (910) can be connected to the graphics adapter (950). Architectures for a peripheral bus include PCI, USB, and the like.

CPUs (941), GPUs (942), FPGAs (943), and accelerators (944) can execute certain instructions that, in combination, can make up the aforementioned computer code. That computer code can be stored in ROM (945) or RAM (946). Transitional data can be also be stored in RAM (946), whereas permanent data can be stored for example, in the internal mass storage (947). Fast storage and retrieve to any of the memory devices can be enabled through the use of cache memory, that can be closely associated with one or more CPU (941), GPU (942), mass storage (947), ROM (945), RAM (946), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (900), and specifically the core (940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (940) that are of non-transitory nature, such as core-internal mass storage (947) or ROM (945). The software implementing various embodiments of the present disclosure can be stored in such devices and executed by core (940). A computer-readable medium can include one or more memory devices or chips, according to particular needs. The software can cause the core (940) and specifically the processors therein (including CPU, GPU, FPGA, and the like) to execute particular processes or particular parts of particular processes described herein, including defining data structures stored in RAM (946) and modifying such data structures according to the processes defined by the software. In addition or as an alternative, the computer system can provide functionality as a result of logic hardwired or otherwise embodied in a circuit (for example: accelerator (944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A system of near eye display, comprising:

a display block comprising:

a display panel comprising a pixel array, and one or more optical elements configured to direct light beams generated by the display panel to an image receiver to perceive an image displayed by the display panel as a virtual image;

a shift block coupled to the display block, the shift block being configured to apply a spatial pixel shift adjustment to the virtual image; and a controller coupled to the display block and the shift block, the controller being configured to provide a first image to the display block with a first spatial pixel shift adjustment, and provide a second image to the display block with a second spatial pixel shift adjustment, the first spatial pixel shift adjustment causing the first image to be perceived as a first virtual image at first pixel locations, the second spatial pixel shift adjustment causing the second image to be perceived as a second virtual image at second pixel locations that are shifted from the first pixel locations, wherein the first pixel locations have a minimum pixel distance in a direction, the second pixel locations are shifted from the first pixel locations by a fraction of the minimum pixel distance in the direction, the pixel array has a first resolution, the first image is sampled at first positions on a first high resolution image having a higher resolution than the first resolution, the second image is sampled at second positions that are shifted from the first positions on the first high resolution image, and a difference between the second spatial pixel shift adjustment and the first spatial pixel shift adjustment corresponds to a shift from the first positions to the second positions on the first high resolution image.

2. The system of claim 1, wherein the shift block comprises a mechanical shifter configured to apply the spatial pixel shift adjustment.

3. The system of claim 2, wherein the mechanical shifter is configured to shift the display panel to apply the spatial pixel shift adjustment.

4. The system of claim 2, wherein the mechanical shifter is configured to shift at least a first optical element in the one or more optical elements to apply the spatial pixel shift adjustment.

5. The system of claim 2, wherein the mechanical shifter comprises at least one of a piezoelectric actuator, an electrostatic actuator, a magnetic actuator, a linear resonant actuator, and an eccentric rotating mass (ERM) vibration motor.

6. The system of claim 1, wherein the shift block comprises an optical shifter coupled to at least a first optical element in the one or more optical elements to apply the spatial pixel shift adjustment.

7. The system of claim 6, wherein the optical shifter comprises at least one of a liquid lens modulator and/or a liquid crystal lens modulator.

8. The system of claim 6, wherein the optical shifter comprises a switchable liquid crystal coated over a surface of a prism film, the switchable liquid crystal is configured to have different refractive index values under different bias voltages.

9. The system of claim 1, wherein the controller is configured to provide a plurality of images to the display block with synchronized spatial pixel shift adjustments, the plurality of images including the first image and the second image.

10. The system of claim 1, wherein the controller is configured to provide sampled images that are sampled from a plurality of high resolution images to the display block with spatial pixel shift adjustments, each of the plurality of high resolution images is down-sampled to generate K sampled images, K is a positive integer, the plurality of high resolution images has a first frame rate, the sampled images are provided to the display block with a second frame rate that is K times of the first frame rate, and the plurality of high resolution images includes the first high resolution image.

11. The system of claim 9, wherein the second image is identical to the first image.

12. The system of claim 1, wherein the first image and the second image are displayed at different times on the pixel array.

13. A method of image display in a near eye display system, comprising:

providing a first image to a display block that includes a pixel array, the display block comprising a display panel and one or more optical elements to direct light beams generated by the display panel to be perceived as a virtual image, the display block displaying the first image with a first spatial pixel shift adjustment that causes the first image to be perceived as a first virtual image having first pixel locations;

providing a second image to the display block, the display block displaying the second image with a second spatial pixel shift adjustment that causes the second image to be perceived as a second virtual image having second pixel locations that are shifted from the first pixel locations;

synchronizing a display of the first image and the second image with an application of the first spatial pixel shift adjustment and the second spatial pixel shift adjustment;

determining that an image has a first resolution that is higher than a second resolution of the display panel; and down-sampling the image of the first resolution to partition the image into at least the first image and the second image of the second resolution.

14. The method of claim 13, further comprising:

controlling a mechanical shifter to apply the first spatial pixel shift adjustment and the second spatial pixel shift adjustment.

15. The method of claim 14, wherein the controlling the mechanical shifter further comprises:

controlling the mechanical shifter to shift the display panel to apply the first spatial pixel shift adjustment and the second spatial pixel shift adjustment.

16. The method of claim 14, wherein the controlling the mechanical shifter further comprises:

controlling the mechanical shifter to shift at least a first optical element in the one or more optical elements to apply the first spatial pixel shift adjustment and the second spatial pixel shift adjustment.

17. The method of claim 14, wherein the controlling the mechanical shifter further comprises:

controlling at least one of a piezoelectric actuator, an electrostatic actuator, a magnetic actuator, a linear resonant actuator, and an eccentric rotating mass (ERM) vibration motor.

18. The method of claim 13, further comprising:

controlling an optical shifter coupled to at least a first optical element in the one or more optical elements to apply the first spatial pixel shift adjustment and the second spatial pixel shift adjustment.

19. The method of claim 18, wherein the controlling the optical shifter further comprises:

controlling at least one of a liquid lens modulator and/or a liquid crystal lens modulator to apply the first spatial pixel shift adjustment and the second spatial pixel shift adjustment.

20. The method of claim 18, wherein the controlling the optical shifter further comprises:

controlling a bias voltage to a switchable liquid crystal coated over a surface of a prism film, the switchable liquid crystal is configured to have different refractive index values under different bias voltages.

21. The method of claim 13, wherein the down-sampling the image further comprises:

sampling the image of the first resolution at first positions to generate the first image of the second resolution; and sampling the image of the first resolution at second positions that are shifted from the first positions on the image to generate the second image of the second resolution, a difference between the second spatial pixel shift adjustment and the first spatial pixel shift adjustment corresponding to a shift from the first positions to the second positions.

22. The method of claim 13, further comprising:

receiving a plurality of high resolution images of the first resolution, the plurality of high resolution images having a first frame rate;

sampling the plurality of high resolution images to generate sampled images of the second resolution, each of the plurality of high resolution images being down-sampled to generate K sampled images of the second resolution, K is a positive integer; and providing the sampled images of the second resolution to the display block at a second frame rate that is K times of the first frame rate.

23. The method of claim 13, wherein the first image and the second image are displayed at different times on the pixel array.

* * * * *